No. 881,263. PATENTED MAR. 10, 1908.
C. V. ROTE & P. E. SHEE.
CAR BRAKE.
APPLICATION FILED JUNE 3, 1907.

2 SHEETS—SHEET 1.

Witnesses
Inventors
Charles V. Rote
Parke E. Shee
By
Attorney

No. 881,263. PATENTED MAR. 10, 1908.
C. V. ROTE & P. E. SHEE.
CAR BRAKE.
APPLICATION FILED JUNE 3, 1907.

2 SHEETS—SHEET 2.

Witnesses

Inventors
Charles V. Rote and
Parke E. Shee

By

Attorney

UNITED STATES PATENT OFFICE.

CHARLES V. ROTE AND PARKE E. SHEE, OF LANCASTER, PENNSYLVANIA, ASSIGNORS OF ONE-THIRD TO FREDERICK SHOFF, OF LANCASTER, PENNSYLVANIA.

CAR-BRAKE.

No. 881,263.     Specification of Letters Patent.     Patented March 10, 1908.

Application filed June 3, 1907. Serial No. 377,099.

*To all whom it may concern:*

Be it known that we, CHARLES V. ROTE and PARKE E. SHEE, both citizens of the United States, and both residing at Lancaster, in the county of Lancaster and State of Pennsylvania, have invented a certain new and useful Car-Brake, of which the following is a specification, reference being had therein to the accompanying drawing.

This invention relates to car brakes, the object of the invention being to provide an efficient and reliable combined wheel and track or rail brake embodying two sets of brake shoes and means coöperating therewith for simultaneously throwing all of the brake shoes into action.

A further object of the invention is to so combine and arrange the shoes and connect up the same that the action of one is dependent upon the other, thus insuring the application of the brakes when the brake lever is set in motion.

With the above and other objects in view the nature of which will more fully appear as the description proceeds, the invention consists in the novel construction, combination and arrangement of parts herein fully described, illustrated and claimed.

Figure 1:
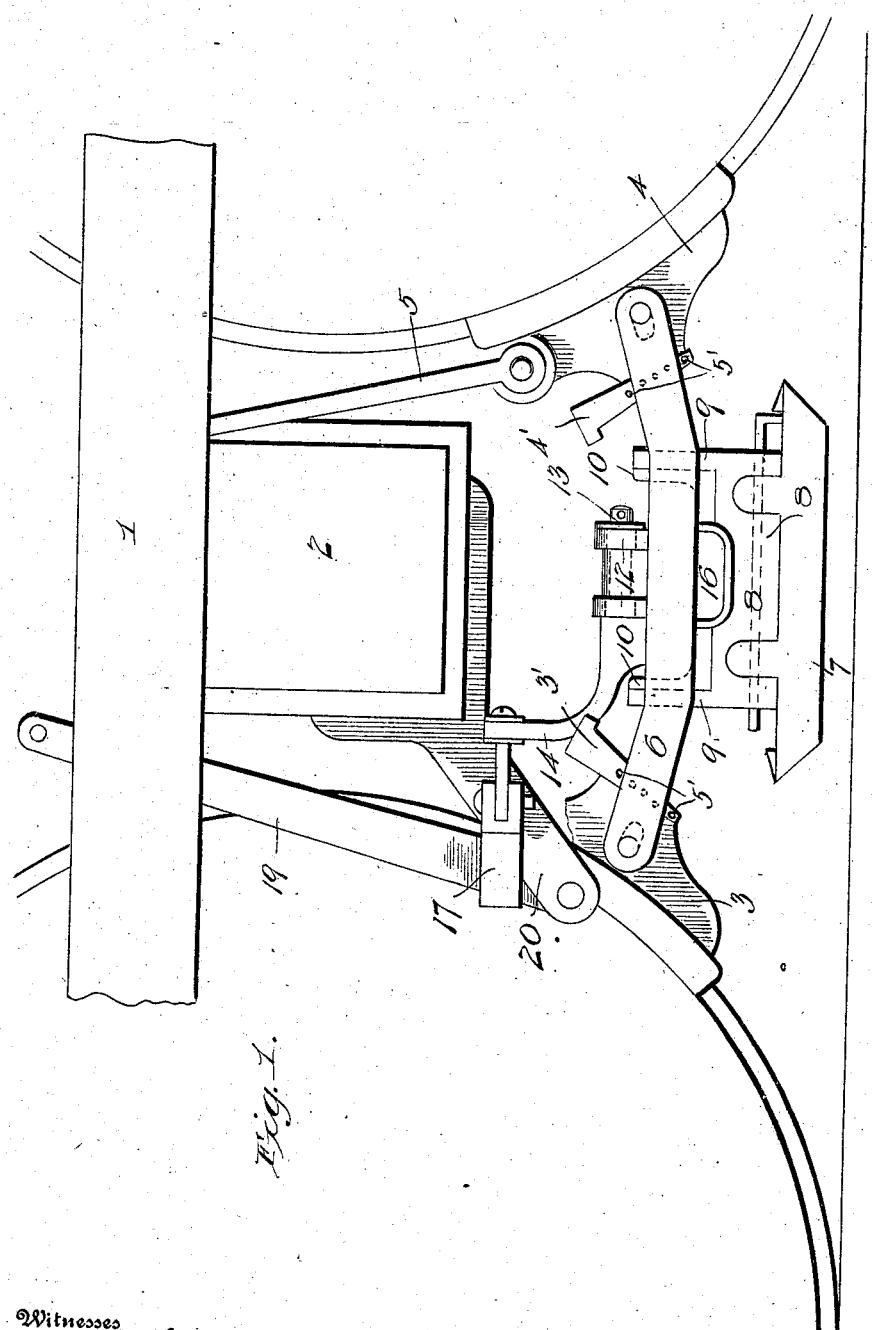
Figure 3:
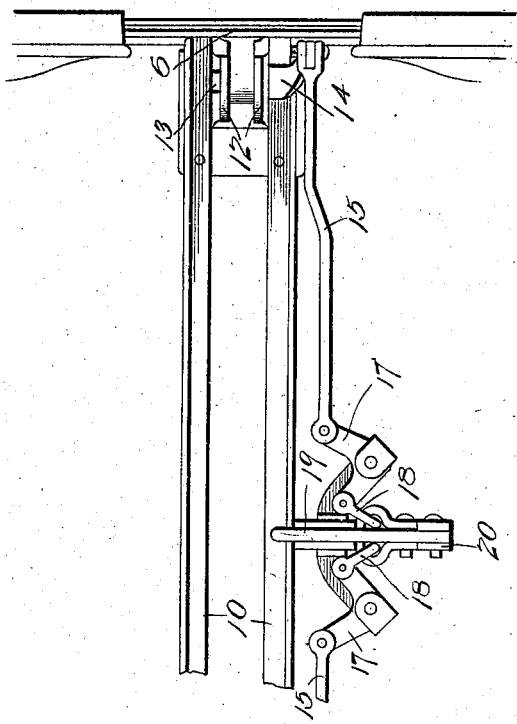
Figure 2:
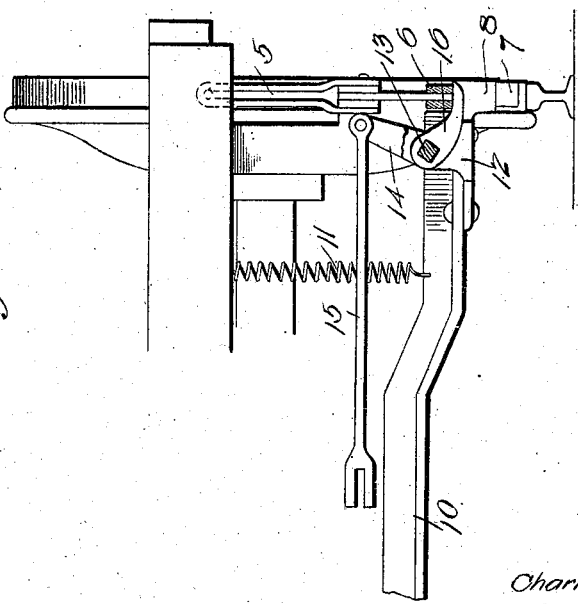

In the accompanying drawings:—Figure 1 is a side view of a car brake embodying the present invention. Fig. 2 is a front or rear elevation taken at right angles to Fig. 1, Fig. 3 is a plan view of the brake mechanism.

The car brake contemplated in this invention is adapted either for single or double truck cars and in order to clearly illustrate the nature of the invention, the brake is shown applied to a truck in which 1 designates the side sills, and 2 one of the cross sills of the truck.

In carrying out the present invention we use a brake shoe for each wheel as indicated in Fig. 1, wherein 3 and 4 represent a pair of wheel brake shoes the said shoes being suspended by hangers 5 from the truck frame and being connected together by a yoke bar 6 which is made in one piece from end to end, while the shoes 3 and 4 are slotted as shown and mounted on the opposite ends of said yoke bar and held by wedges 3' and 4' which are used to force the shoes closer to the wheels to take up wear of the wheels and shoes and all parts connected therewith. The wedges are provided with holes 5' for cotter pins to hold the wedges in place.

7 designates a pair of rail brake shoes located between the wheels as seen in Fig. 1 at the proper distance apart to work directly over the rails. The shoes 7 are detachably connected to the carriers or brake heads 8, the latter having oppositely arranged lugs 9, which embrace and are secured to parallel angle irons 10, whereby the shoes 7 at opposite sides of the truck are coupled together for simultaneous operation. The angle irons are suspended on relief springs 11 from the truck frame above, as shown in Fig. 2, which springs permit the angle irons and brake shoes carried thereby to rise and descend in the operation of the brake mechanism. Each brake head or carrier 8 is provided with lugs 12 in which is journaled a rock shaft 13 having fast on a squared portion thereof a crank arm 14 to which is connected a link 15 extending inward toward the center of the truck as seen in Figs. 2 and 3. The shaft 13 also has fast on a squared part thereof a presser foot or fulcrum bar 16 the end of which projects under the yoke bar 6 and exerts an upward pressure against said bar when the brakes are applied.

The links 15 from opposite rail brake shoes are pivotally connected at their inner ends to bell crank levers 17, the latter, in turn, being connected by short links 18 to a centrally arranged common operating lever or brake lever 19 which may be operated by power or hand as preferred or found desirable. As said brake lever is swung in one direction the links 15 are simultaneously pulled inward thereby drawing the arms 14 inward and rocking the shafts 13. This movement causes the outer ends of the fulcrum bars or presser feet 16 to press upward against the yoke bars 6, but as said yoke cannot move onward any material distance on account of the brake shoes 3 and 4 resting against the wheels, the rock shaft 13 must move downward, thereby carrying the angle irons 10 downward and pressing the rail brake shoes 7 against the rails. In this manner both sets of shoes are simultaneously thrown into action. When the lever 19 is reversed, pressure against the several parts is relieved by the springs 11 which serve to raise the angle irons 10, as before stated.

20 designates a bracket upon which the lever 19 is fulcrumed, the said bracket being attached to the truck frame at any convenient place.

By means of the construction above described, the cost of manufacture of the brake mechanism is materially lessened the mechanism materially simplified by the elimination of the usual right and left hand threads and toggles and jam nuts, and the reliability of operation considerably increased. The suspension springs for the angle irons are free from any downward pressure due to the presence of the usual toggle levers.

We claim:—

1. A car brake embodying a pair of wheel brake shoes, a yoke bar rigidly connecting said shoes, a rail brake shoe, and an operating device interposed between the yoke bar and rail shoe and acting simultaneously on both of said members.

2. A car brake embodying wheel brake shoes and rail brake shoes, yoke bars connecting the wheel brake shoes in pairs, a rail shoe brake beam extending at right angles to said yoke bars, and a lever operating between the wheel brake shoes and the rail brake shoes for simultaneously throwing both sets of shoes into action.

3. A car brake embodying wheel brake shoes, a rigid yoke connecting said shoes to hold them against the wheels, rail brake shoes, a beam connecting the last named shoes, a fulcrum bar mounted on said beam and coöperating with said yoke, and means for operating said fulcrum bar.

4. A car brake embodying wheel brake shoes, yokes connecting said shoes, rail brake shoes, parallel bars connecting the last named shoes, a presser foot mounted on said bars and operating against the yokes, and means for actuating said presser foot.

5. A car brake embodying wheel brake shoes, yokes connecting said shoes, rail brake shoes, a beam connecting the last named shoes, a rock shaft journaled on said beam, a presser foot mounted fast on said shaft, a crank arm on said shaft, and operating means connected with said arm.

In testimony whereof we affix our signatures in presence of two witnesses.

CHARLES V. ROTE.
PARKE E. SHEE.

Witnesses:
EDW. F. SMITH,
FREDERIC SHOFF.